United States Patent
Wang et al.

(10) Patent No.: US 6,619,940 B1
(45) Date of Patent: Sep. 16, 2003

(54) METHOD AND DEVICE FOR CLAMPING ELECTROMAGNETICALLY MOLDS OF INJECTION MOLDING MACHINE

(75) Inventors: Min-Wen Wang, Taipei Hsien (TW); Liteh Hu, Taipei (TW); Hsin Hung Lin, Taichung (TW); Hsuan Peng, Taipei (TW); Ming-Chang Deng, Hsin Chu (TW)

(73) Assignee: Industrial Technology Research Institute (TW)

( * ) Notice: Subject to any disclaimer, the term of this patent is extended or adjusted under 35 U.S.C. 154(b) by 170 days.

(21) Appl. No.: 09/849,365

(22) Filed: May 7, 2001

(51) Int. Cl.[7] .............................................. B29C 45/64
(52) U.S. Cl. .......................... 425/3; 425/190; 425/589
(58) Field of Search ............................ 425/3, 190, 589, 425/595, DIG. 33

(56) References Cited

U.S. PATENT DOCUMENTS 3,887,312 A * 6/1975 Seary ............................ 425/3
5,352,394 A * 10/1994 Fujita et al. ................... 425/3

FOREIGN PATENT DOCUMENTS

| EP | 669198 | * | 1/1995 |
| JP | 5-220798 | * | 8/1993 |
| JP | 6-63954 | * | 3/1994 |
| JP | 8-169040 | * | 7/1996 |

* cited by examiner

*Primary Examiner*—James P. Mackey
(74) *Attorney, Agent, or Firm*—Browdy and Neimark, P.L.L.C.

(57) ABSTRACT

A device for clamping electromagnetically molds of the injection molding machine comprises a stand on which a fixed board and a guiding mechanism are mounted. A movable board is slidably mounted on the guiding mechanism to slide back and forth in relation to the fixed board. The fixed board is provided with a male mold mounted thereon. The movable board is provided with a female mold mounted thereon. The sliding motion of the movable board toward the fixed board brings about the mold opening action, the mold closing action, and the mold locking action. The movable board and the fixed board are provided with a magnetic force generating mechanism for effecting attraction or repulsion between the movable board and the fixed board. The attraction serves to effect the mold closing action and the mold locking action. The repulsion serves to effect the mold opening action.

4 Claims, 4 Drawing Sheets

METHOD AND DEVICE FOR CLAMPING ELECTROMAGNETICALLY MOLDS OF INJECTION MOLDING MACHINE

FIELD OF THE INVENTION

The present invention relates generally to an injection molding machine, and more particularly to a method and a device for clamping electromagnetically the molds of the injection molding machine.

BACKGROUND OF THE INVENTION

The mold clamping technique of the conventional injection molding machine involves an oil pressure cylinder or servo motor, which serves as a power element to carry out the process of closing or opening the mold in conjunction with a toggle mechanism and a tie bar, which are used for enlarging and transmitting the mold locking force. The conventional mold clamping unit is rather complicated in construction and is relatively high in relevant geometric precision dependency. In addition, the mold locking force of the conventional mold clamping unit is unevenly distributed, thereby resulting in poor mold-locking performance. Furthermore, the tie bar is susceptible to fatigue. In light of the deficiencies described above, the conventional injection molding machine can not be miniaturized and refined. It must be noted here that the miniaturization of the injection molding machine is the industrial trend.

The U.S. Pat. No. 5,352,394 discloses injection molding method and apparatus with magnetic mold clamping. The mold board has a front segment, which is displaced by means of a half hold plate which is mounted on a guide threaded rod and is actuated by a servo motor. As other half mold plate is closed, the electromagnetic force is acted as the force establishing source of the mold locking force. In other words, the current output is brought about into the electromagnetic coil of the half mold plate, so as to generate the magnetic force. In the meantime, the molding tool is caused to generate the mold locking force. Upon completion of injection molding, the current supply is interrupted so that the mold locking force is dissipated. The servo motor actuates in reverse the guide threaded rod to open the molding tool. The servo motor is used as a power source to attain the displacement of the mold board so as to close or open the molding tool. The electromagnetic device is another power source device for generating the mold locking force. This structure solves only part of the problems of the conventional injection molding machine and involves the use of two power sources consisting of the servo motor, the guide threaded rod, and the guide threaded rod protecting device, which are expensive component parts. In addition to the high cost, the motion control is complicated.

SUMMARY OF THE INVENTION

It is the primary objective of the present invention to provide a method and a device for clamping electromagnetically the mold of an injection molding machine. The present invention makes use of the electromagnetic force as a power source to bring about the mold board displacement and the mold locking force.

It is another objective of the present invention to provide a method and a device for clamping electromagnetically the mold of an injection molding machine. The motion control of the present invention is precise and easy.

The present invention comprises a stand, a fixed board mounted on the stand, a guiding mechanism mounted on the stand, a movable board mounted slidably on the guiding mechanism, one set of molding tool having a male mold and a female mold, which are respectively mounted on the fixed board and the movable board. The mold opening action, the mold closing action, and the mold locking action are brought about by the sliding motion of the movable board in relation to the fixed board. The movable board and the fixed board are internally provided with a power source device which has a magnetic force generating mechanism. At least the magnetic force direction and the magnetic force magnitude of one side are adjustable such that an attractive force and a repulsive force are effected between the movable board and the fixed board. The attractive force serves as the mold closing force and the mold locking force between the mold boards. The repulsive force serves as the mold opening force.

DETAILED DESCRIPTION OF THE INVENTION

Figure 1:
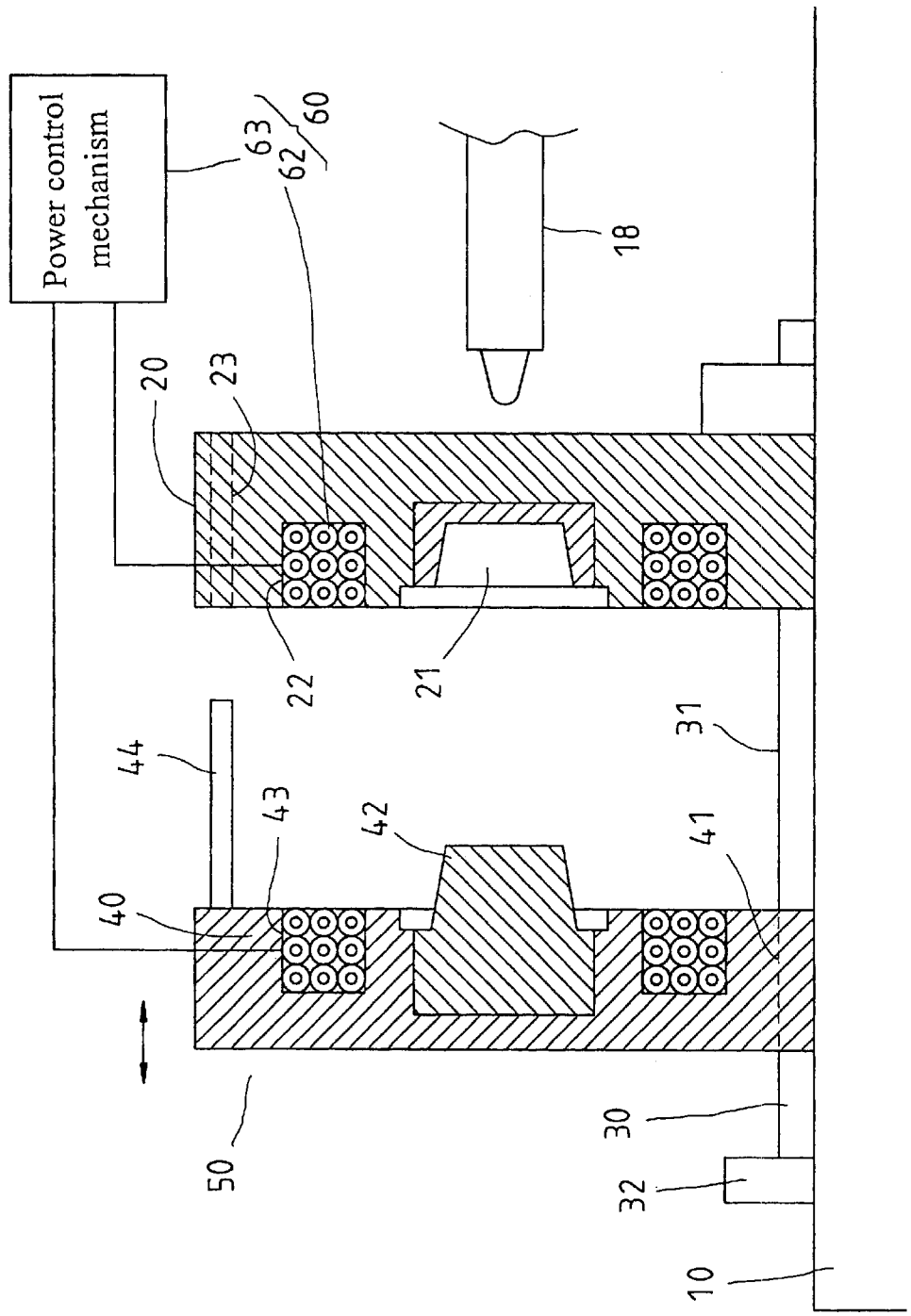
FIG. 1 shows a side sectional view of a first preferred embodiment of the present invention.
Figure 2:
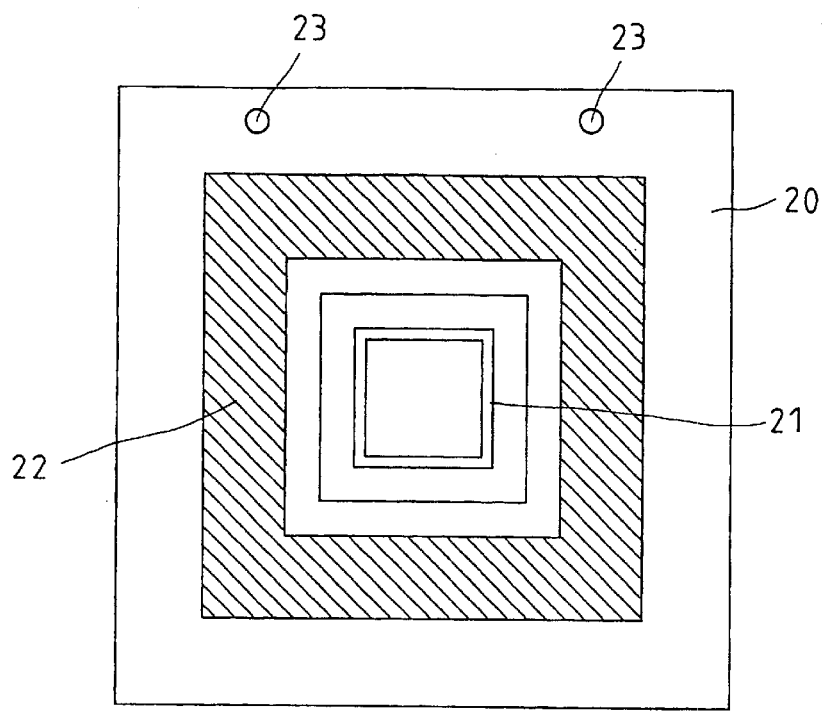
FIG. 2 shows a front view of the fixed board of the first preferred embodiment of the present invention.
Figure 3:
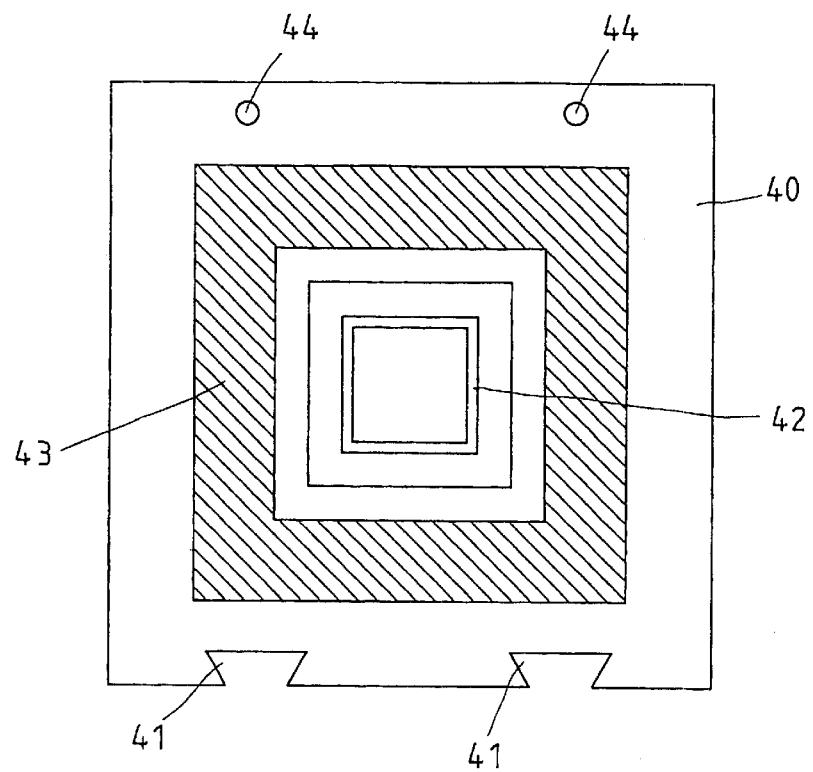
FIG. 3 shows a front view of the movable board of the first preferred embodiment of the present invention.

As shown in FIGS. 1–3, an electromagnetic mold clamping device of the injection molding machine of the present invention comprises the following component parts.

A stand 10 is a work table of the injection molding machine.

A fixed board 20 is mounted on the stand 10 and is provided at the center of the front side thereof with a cavity to accommodate a male mold 21. The fixed board 20 is further provided in the periphery with a slot hole 22, and in the upper end with two locating holes 23.

A guiding mechanism 30 is mounted on the stand 10 and is formed of two guide rails 31 parallel to each other and with one end extending to the bottom end of the fixed board 20 such that other end extends outwards for a predetermined distance and is provided with a position confining member 32 which is adjustable in position.

A movable board 40 is provided at the bottom end with two guide slots 41 complementary in shape to the guide rails 31. The movable board 40 slides back and forth along the guiding mechanism. The movable board 40 is provided at the center of the front side thereof with a cavity to accommodate a female mold 42, and in the periphery thereof with a slot hole 43. The movable board 40 is provided in the upper end with two guiding pillars 44 corresponding to the locating holes 23 of the male mold 21 of the fixed board 20. When the movable board 40 slides in relation to the fixed board 20, the guiding pillars 44 slide in the locating holes 23 of the fixed board 20 so as to help keep the fixed board 20 and the movable board 40 in the parallel position to ensure a precision operation. The sliding ultimate positions of the movable board 40 are the closing position of the fixed board 20, and the joining position of the position confining member 32.

A power source device 50 has a magnetic force generating mechanism 60 which comprises a power source control mechanism 63 and coils 62. The coils 62 are respectively disposed in the slot holes 22 and 43 of the fixed board 20 and the movable board 40. The current control mechanism 63 is connected with the coils 62 for modulating the current magnitude and direction of the coils 62, so as to control the magnitude and the direction of the magnetic force between the fixed board and the movable board.

In the initial state of the operation, the movable board 40 is joined with the side edge of the position confining member 32 of the guiding mechanism 30, so as to proceed with the mold closing operation. The coil 62 is provided by the current control mechanism 63 with a predetermined positive current value. An attraction of a predetermined magnitude is thus brought about between the movable board 40 and the fixed board 20. The movable board 40 is forced to move toward the fixed board 20. As the movable board 40 and the fixed board 20 are completely closed together, the input of another predetermined positive current value is effected so as to bring about a mold locking force preventing the separation of the movable board 40 and the fixed board 20. The mold locking force must be greater than the injection pressure of the injection operation of the injection molding machine. Upon completion of the injection operation, the coil 62 is provided by the current control mechanism 63 with a predetermined negative current value, thereby resulting in generation of a repulsion of a predetermined magnitude between the movable board 40 and the fixed board 20. As a result, the mold opening operation of the movable board 40 and the fixed board 20 is effected such that the movable board 40 is forced to locate at the side edge of the position confining member 32.

In light of attraction and repulsion between objects being inversely proportional to the distance separating the objects, the mold closing displacement force of the movable board 40 and the fixed board 20 is limited by the factors, such as in input current, the number of spiral series of the coil, and the maximum spacing between the movable board 40 and the fixed board 20. Under such conditions as described above, the maximum spacing of the mold opening of the movable board 40 and the fixed board 20 should not excessively large. For this reason, the present invention is especially suitable for the mold clamping device of a miniaturized injection molding machine which is designed for a minute and high precision injection molding.

Figure 4:
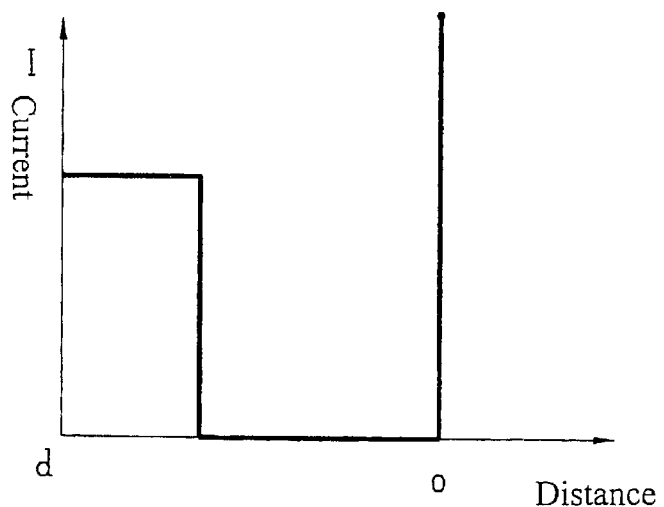
FIG. 4 shows a diagram to illustrate the relationship between the control current of the magnetic force generating device and the interval separating the movable board from the fixed board of the first preferred embodiment of the present invention.
Figure 5:
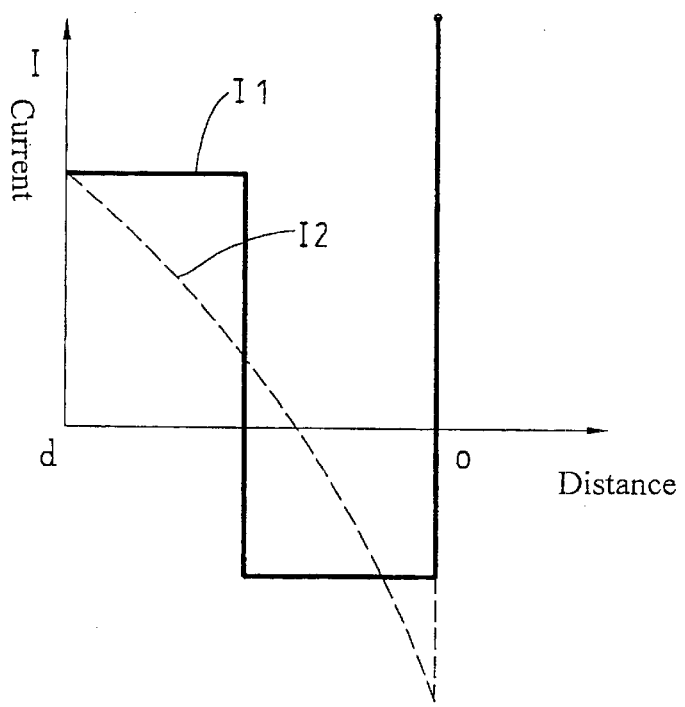
FIG. 5 shows a diagram to illustrate the relationship between the control current of other two magnetic force generating devices and the interval separating the movable board from the fixed board of the first preferred embodiment of the present invention.

The medium-sized or big-sized injection molding machine has a relatively greater mold opening and mold closing stroke, thereby calling for an increase in the number of spiral series of the coil and in the current intensity. Just right at the moment prior to the mold opening, a greater mold closing impetus is brought about by the movable board 40 against the fixed board 20. In order to solve this problem, the current control mechanism 63 should be controlled with precision, as illustrated in FIG. 4. In the mold closing operation, when the movable board 40 and the fixed board 20 have a maximum spacing "d", an input of a predetermined current value is brought about for a period of time without any further input thereafter. The movable board 40 slides forward for a distance at which the movable board 40 is no longer attracted. In light of inertia operation, the movable board 40 keeps sliding forward such that the movable board 40 is acted on in reverse by the friction force of the guiding pillar 44 of the guiding mechanism 30, thereby resulting in deceleration of the movable board 40 as well as the buffer action until such time when the movable board 40 is joined with the fixed board 20. An input of a predetermined current value is once again effected so as to bring about a mold locking force between the movable board 40 and the fixed board 20. Now referring to FIG. 5, the lines I1 and I2 denote other two current control methods, which are different from the above in that the displacement front section of the movable board 40 is provided with a constant or variable positive current value, and that the displacement rear section of the movable board 40 is provided with a constant or variable negative current value. The front section operation is to drive the movable board 40 to displace and accelerate. The rear section operation is intended to bring about deceleration and buffer action.

Figure 6:
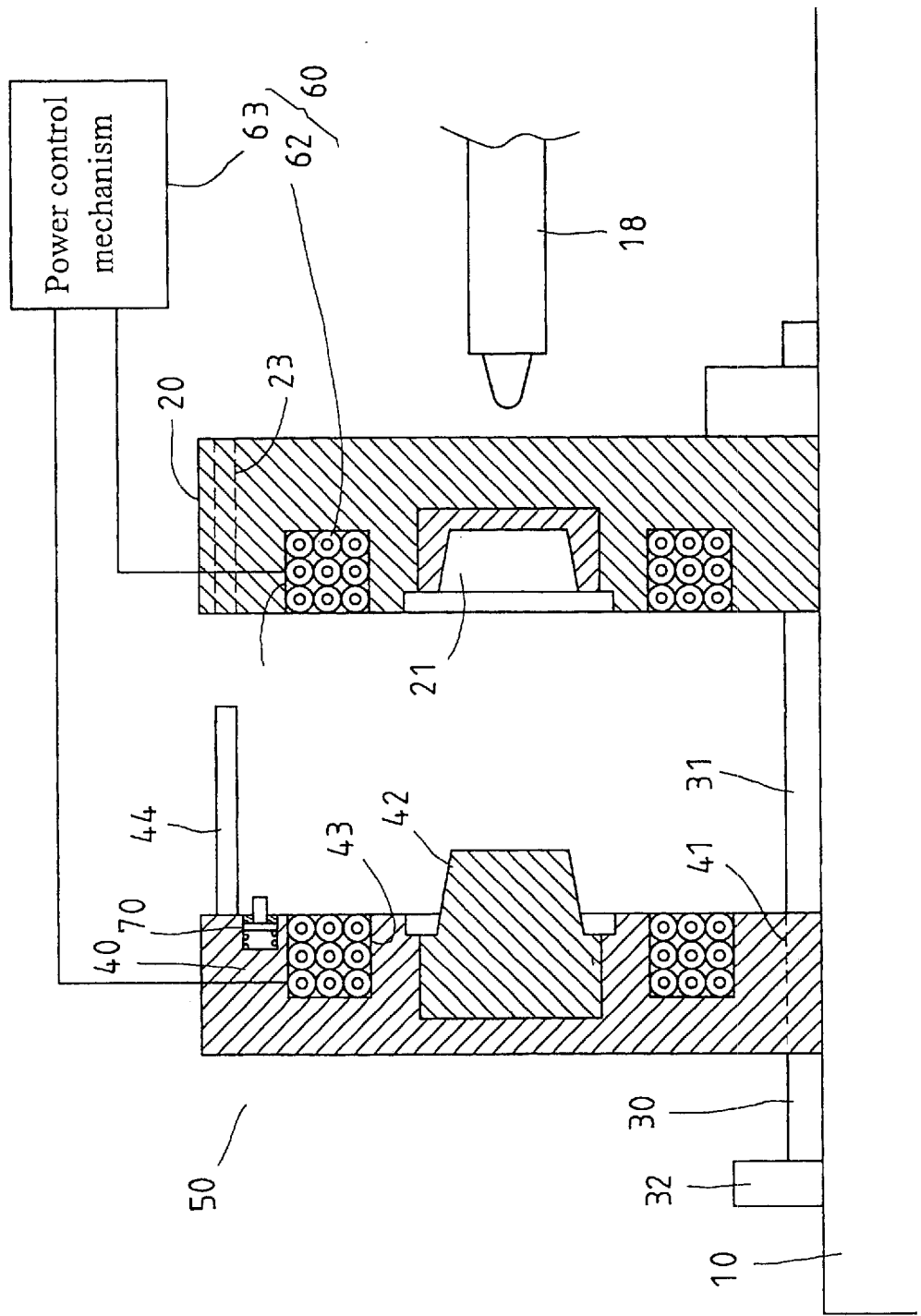
FIG. 6 shows a side sectional view of a second preferred embodiment of the present invention.

As shown in FIG. 6, the second preferred embodiment of the present invention is different from the first preferred embodiment of the present invention in design in that the former comprises a buffer device 70 to bring about the buffer action. The buffer device 70 is mounted on either the movable board 40 or the fixed board 20 and is provided with a resilient member serving as a buffer element. An air pressure or oil pressure element may be used. In order to prevent reduction in the mold locking force of the movable board 40 and the fixed board 20 by the buffer force of the buffer device, the buffer device 70 may be used in conjunction with an electromagnetic valve or releasing mechanism which enables the buffer device to release, eliminate or lower its buffer reverse force, so as to keep the mold locking force at a constant value.

What is claimed is:

1. An electromagnetic mold-clamping device of an injection molding machine, comprising:

a stand;

a fixed board mounted on said stand;

a guiding mechanism mounted on said stand;

a movable board slidably mounted on said guiding mechanism such that said movable board slides back and forth in relation to said fixed board;

a molding tool having a male mold and a female mold, which are respectively disposed on said fixed board and said movable board; and a power source device having a magnetic force generating mechanism which is disposed in said movable board and said fixed board such that at least magnetic force direction and magnitude are adjustable so as to enable said movable board and said fixed board to bring about therebetween an attraction or repulsion, with said attraction serving as a mold closing force and a mold locking force, and with said repulsion serving as a mold opening force;

wherein said guiding mechanism has at least one guide rail which has one end extending to the bottom end of said fixed board, and other end extending outwardly for a predetermined distance and having thereafter a position confining member;

wherein said movable board is provided in the bottom end with at least one guide slot fitted with said guide rail for enabling the sliding ultimate position of said movable board to locate between a closing position of said fixed board and a joining position of said position confining member.

2. The device as defined in claim 1, wherein the position of said position confining member at said guide rail is adjustable to facilitate the control of total displacement range of said movable board.

3. The device as defined in claim 1, further comprising a current control mechanism to control magnetic force direction and magnitude of said magnetic force generating mechanism.

4. The device as defined in claim 1, further comprising a buffer device which is disposed between said movable board and said fixed board to reduce the closing speed of said movable board and said fixed board.

* * * * *